(12) United States Patent
Zimniewicz et al.

(10) Patent No.: US 7,395,513 B2
(45) Date of Patent: Jul. 1, 2008

(54) SYSTEM AND METHOD OF PROVIDING MULTIPLE INSTALLATION ACTIONS

(75) Inventors: Jeff A. Zimniewicz, Bellevue, WA (US); Phillip J. Marino, Dublin, OH (US); Crista Johnson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 10/792,341

(22) Filed: Mar. 3, 2004

(65) Prior Publication Data

US 2004/0169687 A1 Sep. 2, 2004

Related U.S. Application Data

(62) Division of application No. 09/565,927, filed on May 5, 2000, now Pat. No. 6,744,450.

(51) Int. Cl.
*G06F 3/00* (2006.01)
*G06F 9/00* (2006.01)
*G06F 17/00* (2006.01)

(52) U.S. Cl. .................. 715/841; 715/825; 715/853; 717/175; 717/174; 717/168

(58) Field of Classification Search .............. 715/866, 715/762, 763, 825, 826, 966, 765, 769, 771, 715/837; 719/313, 315, 316, 328, 331, 332; 717/116, 120, 121, 162, 165, 168, 174
See application file for complete search history.

(56) References Cited

U.S. PATENT DOCUMENTS

| | | | |
|---|---|---|---|
| 5,519,866 A * | 5/1996 | Lawrence et al. | 717/162 |
| 5,721,824 A | 2/1998 | Taylor | |
| 5,933,637 A * | 8/1999 | Hurley et al. | 717/107 |
| 5,933,646 A | 8/1999 | Hendrickson et al. | |
| 5,950,010 A | 9/1999 | Hessee et al. | |
| 5,960,204 A | 9/1999 | Yinger et al. | |
| 5,966,540 A | 10/1999 | Lister et al. | |
| 6,134,593 A | 10/2000 | Alexander et al. | |

(Continued)

OTHER PUBLICATIONS

Plumley, "Documented Backoffice", John Wiley & Sons, Inc., 1998, Part 1, pp. 1-88.

(Continued)

*Primary Examiner*—David Wiley
*Assistant Examiner*—Boris Pesin
(74) *Attorney, Agent, or Firm*—Amin, Turocy & Calvin, LLP

(57) ABSTRACT

A system and method are presented for a suite integration toolkit (SIT) allowing for the provision and display of a rich set of installation actions. The user interface (UI) provides a list box interface having pull down menus for the display and selection of component defined installation actions. Preferably the SIT is used to install a suite of applications having multiple components and sub-components. These components and sub-components are displayed with the install action selected and the disk space required displayed. The UI also provides a summation of the required disk space of only those components that will actually be installed, taking into consideration and excluding from the summation required components that are already installed. An interface method is implemented by each of the components to expose a method to allow the SIT to query the component for its available installation actions and results.

8 Claims, 14 Drawing Sheets

U.S. PATENT DOCUMENTS

| | | |
|---|---|---|
| 6,239,800 B1 | 5/2001 | Mayhew et al. |
| 6,260,078 B1 * | 7/2001 | Fowlow ..................... 719/332 |
| 6,279,154 B1 | 8/2001 | Davis |
| 6,282,711 B1 | 8/2001 | Halpern et al. |
| 6,327,705 B1 | 12/2001 | Larsson et al. |
| 6,378,128 B1 | 4/2002 | Edelstein et al. |
| 6,473,771 B1 | 10/2002 | Zimniewicz et al. |
| 6,618,857 B1 | 9/2003 | Zimniewicz et al. |
| 6,668,289 B2 | 12/2003 | Cheng, Jr. et al. |
| 6,698,018 B1 | 2/2004 | Zimniewicz et al. |
| 6,976,222 B2 * | 12/2005 | Sojoodi et al. .............. 715/763 |
| 2003/0110241 A1 | 6/2003 | Cheng, Jr. et al. |
| 2005/0172283 A1 | 8/2005 | Delo |

OTHER PUBLICATIONS

*Smart Update Developer's Guide*, "Chapter 4 Writing an Installation Script", available at http://developer.netscape.com/docs/manuals/communicator;jarman/install.htm, accessed Jan. 15, 2001.

U.S. Appl. No. 09/535,211, filed Mar. 27, 2000.

U.S. Appl. No. 09/557,143, filed May 5, 2000.

* cited by examiner

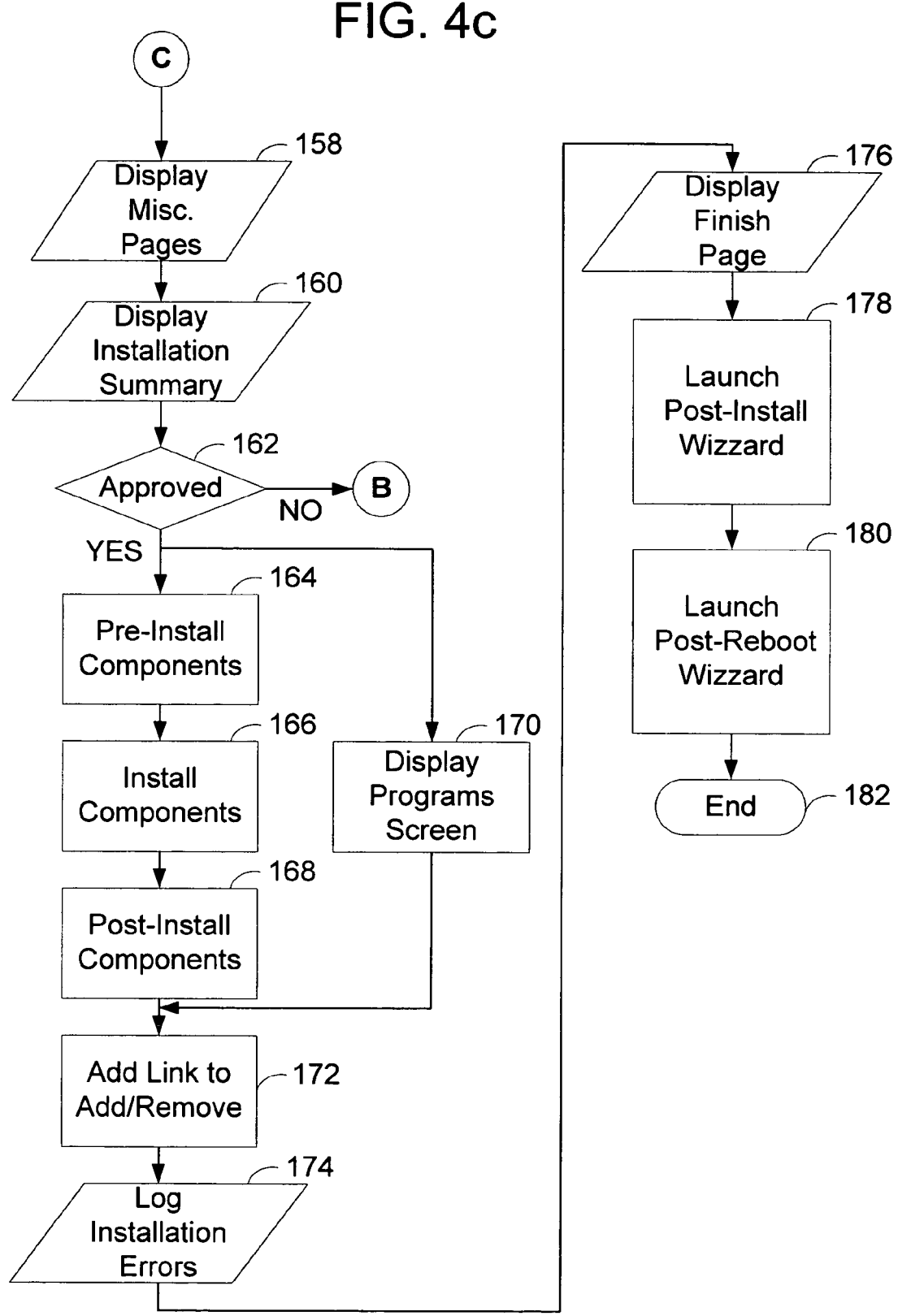

SYSTEM AND METHOD OF PROVIDING MULTIPLE INSTALLATION ACTIONS

CROSS-REFERENCE TO RELATED PATENT APPLICATION

This patent application is a divisional of Ser. No. 09/565,927 now U.S. Pat. No. 6,744,450, filed May 5, 2000, entitled "System and Method of Providing Multiple Installation Actions". The entire teachings and disclosure of this patent are hereby incorporated in their entireties by reference thereto.

TECHNICAL FIELD

This invention relates generally to systems and methods for installing application program suites and, more particularly, relates to the number and type of install actions, and their availability, selection, and display.

BACKGROUND OF THE INVENTION

With the continued growth and specialization of various software applications for both business and residential users, software original equipment manufacturers (OEMs) and secondary value added providers (VAPs) have begun selectively combining these applications into suites. The selection of the particular applications to include in a suite is made based on certain synergies desired to be achieved for a particular customer or group of customers. In this way a business customer, for example, may purchase a single suite that provides all of the applications to allow complete productivity for all of the functions that are normally performed in the business environment. This selection and grouping process by the OEMs and/or the VAPs greatly simplifies the decision process at the user level, and typically allows for a common user experience across applications since typically all applications will be from a particular OEM.

Another advantage provided by a suite of applications exists at the system administration level. Unlike the requirement of having to separately install and setup each individual application, entering the same user information over and over for each application, the installation of a suite is much more integrated. Most suites employ an installation wizard of some sort that installs and sets up all of the applications within the suite at one time. While this presents a distinct advantage over the individual application installation and setup, the structure and content of modern suites present problems for current installation processes that often result in confusion on the part of the user.

While many suites comprise a group of separate applications bundled together forming, in essence, an aggregation of applications as discussed above, more advanced and sophisticated suites actually comprise a multitude of inter-dependent applications. Indeed, many of the application programs themselves are actually mini-suites of related or complementary applications integrally operating as a "single" application. Unfortunately, these mini-suites present additional problems that add to the user confusion.

One problem lying at the core of the user confusion relates to the type of installation actions available through the conventional installation programs, and the presentation of these options to the user via the conventional check-box user interface (UI). Traditional setup applications, such as that illustrated in FIG. 10 and FIG. 11, provide a user interface that shows a set or list of the components in the suite in a window 500 or list box. Next to each of the components of the suite is a small check box 502 or area that illustrates the selection or deselection of that component. Typically, a check mark is illustrated next to each component that will be installed in the default installation scenario.

This check box UI allows a user to decide which components she wants to install, and which components she does not want to install. In this situation, a check mark next to a component represents that that component will be installed (i.e. install component), and no check mark represents that that component will not be installed (i.e. do nothing). Unfortunately, when the user wanted to remove a component that was already installed, the user would click on a component that has a check mark next to it to remove the check mark. In this situation, a check mark next to a component represents that that component is already installed (i.e. do nothing), and no check mark represents that that component will be removed (i.e. uninstall component).

While such operation of current installation applications is functionally correct, the presentation and implementation can be a bit confusing to users. This confusion becomes apparent, for example, in situations where one or more of the components or sub-components included in a new suite are already installed on the user's machine. In such a situation, when a user begins to setup and install the new suite, the installation application will detect the presence of these components and will place a check mark next to them in the UI. The installation application, however, also places check marks next to the components that are not currently installed, but that will be installed by the installation application. It is difficult, therefore, to determine from the displayed check marks which components the user will be installing and which components are already installed (in which case no action would be taken on those components). It is possible for a user to interpret the check mark as an install command, realize that she already has that component installed, believe that leaving the box checked will result in the re-installation of that component, and not wanting to re-install that component un-check the box. Unfortunately, this action will likely result in the component being removed from the user's system because a non-checked box for an installed component is interpreted by many install applications as an uninstall request as described above.

Further, the check box interface used with most current installation applications provides the ability to request only two types of install actions. That is, the check box can be checked or not. As described above for a component that is not installed, the check signifies that the component will be installed, and no check signifies that the installation application will not install the component (i.e. do nothing). Also as described above, if the component is already installed, the check signifies that the installation application will leave the component installed (do nothing), and no check signifies that the installation application will uninstall the component. Some installation applications also provide a separate selectable option for components that are already installed, to wit, reinstall. When this additional option is selected, typically a separate UI screen is displayed, such as that illustrated in FIG. 12, with additional selectable options, such as "remove all" 504, "reinstall" 506, and "add/remove" 508. However, if only one or a few of the components need to be upgraded to a current version, the only option is to select "reinstall," which will reinstall component that do not require any upgrade. This may require a significant amount of time to complete.

As may be apparent from the above description of the current check-box installation framework, the amount and types of install actions are limited to those described above. There is essentially no flexibility to add additional types of installation actions under this framework, or to allow a component to define particular component-specific actions to be performed. For example, components such as e-mail applications that have large data stores often place those stores on different drives than those on which the actual application is stored. In such situations, a disk failure for the application disk may leave the data stores totally intact. Since the data stores may include several hundred gigabytes of data, whereas the application may only require a few hundred megabytes, it is desirable to provide an additional install action other than reinstall all, which would not require a migration of the data stores. Unfortunately, while such programs can provide a "forklift" or recovery option that would look for the data store and only reinstall the application without requiring the user to reconfigure the machine, no such additional action of this type is allowed under the current check-box framework. Therefore, a user could only choose "reinstall all," which action would require reconfiguration of the machine and migration of the data. Such actions typically take several days to complete for most organizations.

Therefore, there exists a need in the art to overcome these and other problems existing with the current state of suite installation programs. Specifically, there exists a need to present the installation actions to a user in a logical and easy to understand way that allows them to clearly see the state of the components affected, and what actions will be performed. Further, there exists a need to allow components to define custom installation actions and allow these custom actions to be included at the installation application run time.

SUMMARY OF THE INVENTION

The inventive concepts disclosed herein involve a new UI presentation and additional available custom actions for an installation application, such as a Suite Integration Toolkit (SIT). The system of the invention significantly improves the user experience during an installation of a suite of components by providing a rich set of install actions for user selection and by providing feedback information which is easy to understand.

The UI presentation and concepts behind the custom install actions of the instant invention solve the above identified and other problems by asking a component to provide a list of the install actions that it can support. Further, SIT recommends that the default actions (install, uninstall, and no action) be supported. The UI preferably presents this list to an end-user in a listbox that is displayed for each component upon selection of a drop-down arrow, allowing the user to select whichever install action works best for her. However, the display of this information may take other forms (or no UI allowing access instead via script). Additional information is conveyed to the user during the installation process, such as whether or not components are installed already on the computer. This information is presented in various forms, such as check marks, color differences, highlighting, etc.

The benefits of the instant invention are realized by having each of the components implement an ISetupComponent interface. This interface exposes a method to allow another component or manager of the Suite Integration Toolkit (SIT) to query the component for a specific interface, such as ISetupInstallActionCollection. When this interface is queried, it returns a list of the available actions for that component. These actions may include custom actions that have no meaning outside of that particular component. The component is given the ability to define these custom actions, so long as the outcome thereof is provided to the SIT. Such actions may include, e.g., forklift, recovery, migrate, repair, etc. This extensibility of install actions in combination with the new UI greatly improves the user experience and releases the component constraints of prior installation applications.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 4a-c are simplified process flow diagrams illustrating the basic flow of a suite setup in accordance with a method of the instant invention;

DETAILED DESCRIPTION OF THE INVENTION

Figure 1:
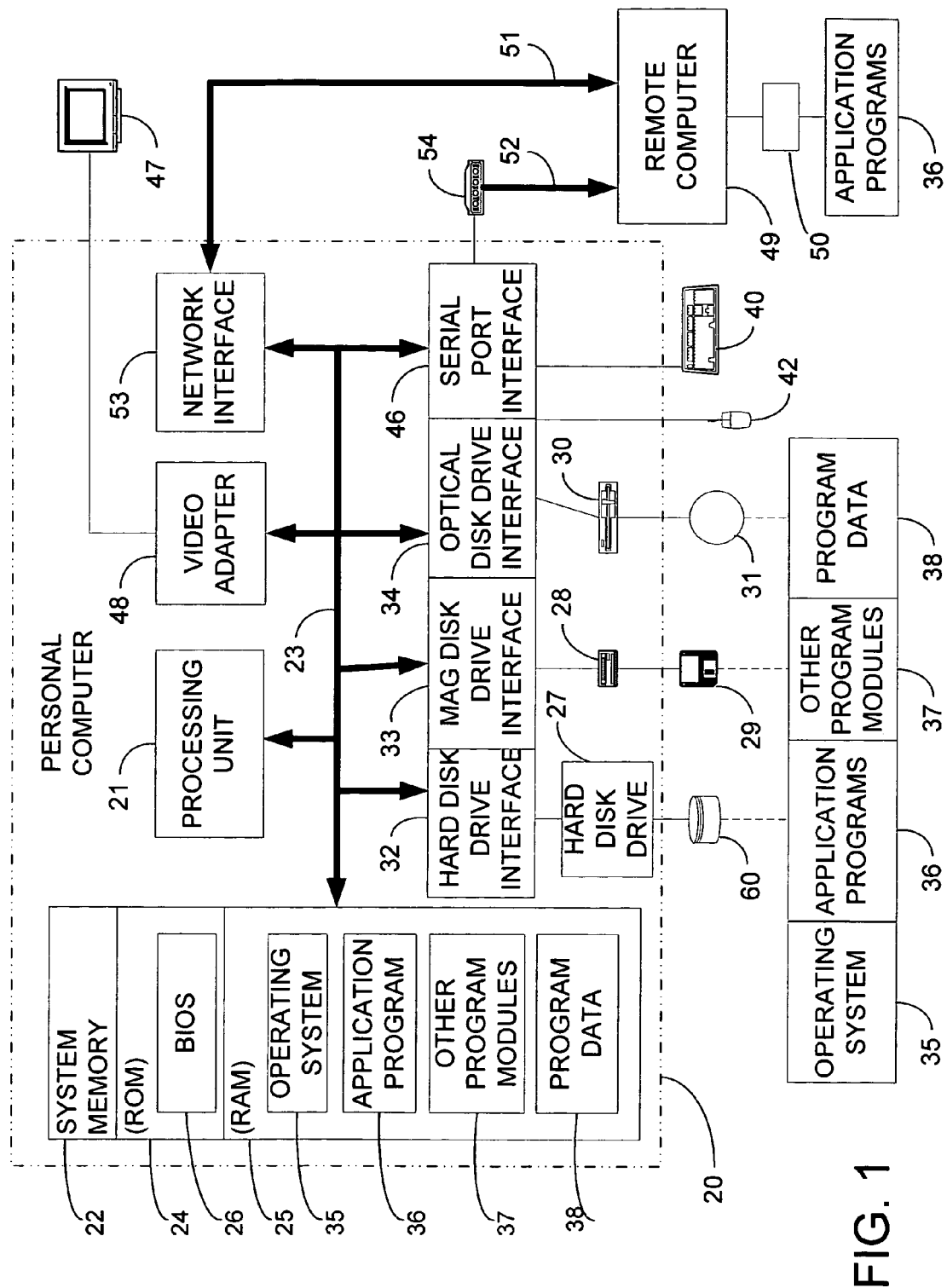
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, a system and method are presented that allows the addition and customization of install actions definable by application components to be installed. Further, a new user interface (UI) is presented that allows a logical and easily understandable presentation of the current state and defined actions available and selected for an installation application. This system is embodied in a Suite Integration Toolkit (SIT) and utilizes a common architecture used for a setup database file (setup.sdb) to identify components and their available actions to be performed during the installation and setup thereof. SIT complements, but does not replace, existing installer technology. SIT works as an integration layer for disparate setups but does not perform core setup tasks such as file copy, registry operations, etc., although it may be expanded to do so if desired.

In addition to addressing existing installation issues as discussed above, SIT also preferably provides a flexible and extensible COM layer for applications that want to hook into setup. This allows these applications to modify the UI, launch additional processes during the particular phases of setup, or install components that have previously been downloaded to a central directory on the local machine. While significant advantages are presented when SIT is COM based, one skilled in the art will recognize that SIT may be programmed using other technology without departing from the scope or spirit of the teachings herein.

Figure 2:
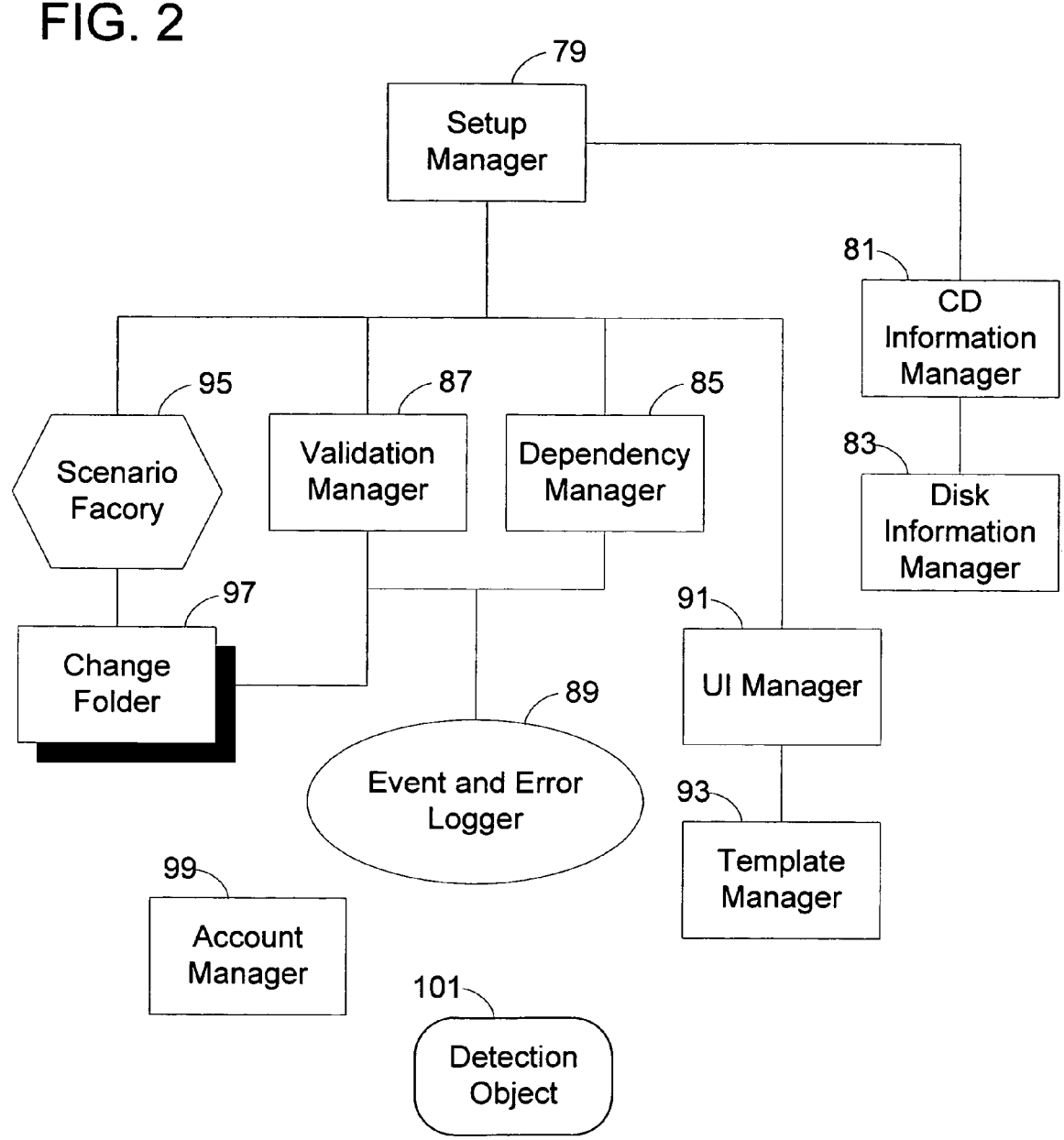
FIG. 2 is a simplified architectural block diagram of an embodiment of the Suite Integration Toolkit of the instant invention.

To gain a better appreciation of the SIT of the instant invention, attention is now directed to the simplified architectural block diagram of FIG. 2. While this FIG. 2 illustrates the SIT as functional blocks or objects, there is no intention to limit the scope of the invention to such blocks or objects, or to any particular technology or programming methodology. Instead, this simplified diagram is presented by way of illustration to aid in the understanding of the logical functionality of an aspect of the instant invention, and is not presented by way of limitation.

The SIT includes a Setup Manager 79 that drives the installation process through the setup.sdb files for the suite. CD 81 and Disk 83 Information Managers provide required information concerning file location, size, etc. for the suite CD(s) during the integration process, and for the user's system onto which the suite will be installed. During the installation process, the Setup Manager 79 utilizes the services of a Dependency Manager 85 to ensure that the required dependencies of the application programs within a suite are met. This ensures that the installation may proceed through each phase without error, and so that the application programs may run on the user's system once installed. A Validation Manager 87 is also used by the Setup Manager 79 to verify that required system components needed by the suite are met by the user's system for much the same reasons as for the Dependency Manager 85. If an error is determined during either of these checks, it is logged by an Event and Error Logger 89.

During the installation process, the Setup Manager 79 also employs the services of an UI Manager 91 to display the proper information to the user as will be described in greater detail below. This UI Manager 91 may utilize a Template Manager 93 if it wants to display standardized pages provided with the SIT. The UI Manager 91 may also display any customized pages identified in the setup.sdb file during the installation and setup of the suite. During this installation and setup, the SIT may utilize a Scenario Factory 95 to install only selected application programs or components from the suite as selected by a user or as pre-configured by the suite owner. The Change Folder object 97 is used to change the installation folder for a component in the suite. SIT may also employ an Account Manager 99 if required during the installation and setup process. The SIT 78 also includes a Detection Object 101.

While not specifically illustrated in FIG. 2, SIT may include an intermediate layer (dll) that will enable integration of an application program which relies on a different installation and setup technology (e.g., InstallShield) into the suite. This intermediate layer will wrap the application's installation technology and SIT. During installation and setup, SIT will command the component or application to install, and the dll will launch the application's installation technology.

The installation and setup process of the instant invention is seamless from a user's perspective. The SIT determines all of the information requirements for each of the application programs to be installed. SIT then takes the superset of this information and builds the information queries for display to the user to collect the required information. This information is then distributed to each application that requires it, i.e. all applications have access to the collected information. In this way, a given piece of information is collected from a user only one time. If, however, a particular application does not accept that information or otherwise requires different or contrary data for the same piece of information, SIT generates an additional information screen, the information from which will be delivered only to the application that required the different data.

The installation process is actually divided into two primary stages: baseline and install. Baseline may include both a "suite" baseline and a "scenario" baseline, or the scenario baseline can be rolled into the suite baseline if desired. The install stage of the instant invention is divided into pre-install, install, and post-install actions on a component level. The Setup Manager 79 and UI Manager 91, two of the top-level objects of SIT, handle integration of the component installations and the UI. The Dependency Manager 85 provides dependency checking and install-order calculation and verification across all selected components as mentioned above. Suite owners who want to make use of a pre-defined set of SIT UI templates can use the Template Manager 93 to load a Wizard page, passing in the required information for that template. One such template provided may be used for the display and selection of component install actions as will be described below in association with FIG. 5. Alternately, suite owners who require custom UI can write their own dialogs that are hosted in a Wizard frame (header w/title, description and small graphic and footer with navigation buttons). In both cases, components and/or scenarios handle validation and error reporting for any user input.

A baseline is a requirement determined by the suite owner. It concerns what OS/applications must be on a user's machine before installation of the suite can begin. Suite baseline denotes the actions necessary to get the machine to the required state for the installation of an application or suite. This may include installation of a required OS, any SPs, hot fixes, or additional applications necessary for the component or suite to install. Baseline install actions may or may not be visible to the user (i.e. install hot fixes as hidden components). By default, the UI Manager 91 displays start up screens to the user during this stage, including Welcome, Name/Organization, Password, product identification (PID), and end user license agreement (EULA) screens. All startup screens can be shown/hidden as desired via a [Startup Sequence] section of the setup data file.

Each component must provide information on its (and any sub components) suite baseline requirements. If the suite baseline is not met for a component, any requirements beyond the suite baseline are considered part of the scenario baseline and are displayed to the user on the Scenario Baseline page. If the user chooses not to install the scenario baseline components, Setup Manager 79 prevents the installation of the affected component/sub components. If the setup is unattended (hence the user does not know if the suite baseline has not been met), baseline components are installed silently. If this is not possible (i.e. due to baseline component install restrictions or baseline component is not available), then a message is written out to the error log indicating why the install cannot proceed. If the setup is attended and the Welcome page has been turned off in the setup data file, the Welcome page will still appear if the suite baseline has not been met. If the suite is checking for but not installing baseline components, and the check indicates that the suite baseline has not been met, the user will not be allowed to click on Next in the Welcome screen.

Suite baseline components may have dependent components. If these dependent components have not been marked as suite baseline components, SIT sets them as baseline components and tries to install them. If SIT cannot install the dependent components (and hence the suite baseline component), SIT informs the user, logs the error, terminates installation of the component which has a missing dependency, and continues with the rest of the installation. This is similar to the "debug and release" methodology. In this way, the entire suite installation is not adversely affected by one failed component. The details of the UI provided for this functionality in accordance with the teachings of the instant invention will be described below.

As an example of this dependency requirement and the resultant accommodations that SIT makes, consider a suite with Program A, Program B, and Program C included therein. Now assume that Program B is dependent on Program C, i.e. Program B needs Program C for proper operation. SIT will detect this dependency and will install Program C before Program B, even if this requires that the install order in setup.sdb be changed. If, for some reason, Program C cannot be successfully installed, or if Program C is simply not included on the suite CD, SIT will inform the user that a required dependency is missing, skip the installation of Program B, and continue with any other installations remaining for the suite.

SIT also supports a scenario baseline. In instances where a user selects a scenario from a Scenario Selection page that has a higher baseline than the entire suite (e.g. when a third-party adds a scenario and does not update the suite baseline), SIT first checks the scenario baseline for the selected scenario. Next, SIT informs the user if scenario baseline has not been met. By default, SIT provides the Scenario Baseline page that displays what components need to be on the user's machine and what components are currently installed, similar to the Welcome page used for communicating suite baseline requirements. The user can click Next to install the scenario baseline components and continue with the installation, click Cancel to exit setup, or click Back to select a different scenario. Finally, SIT installs the scenario baseline components if they are available.

Figure 3:
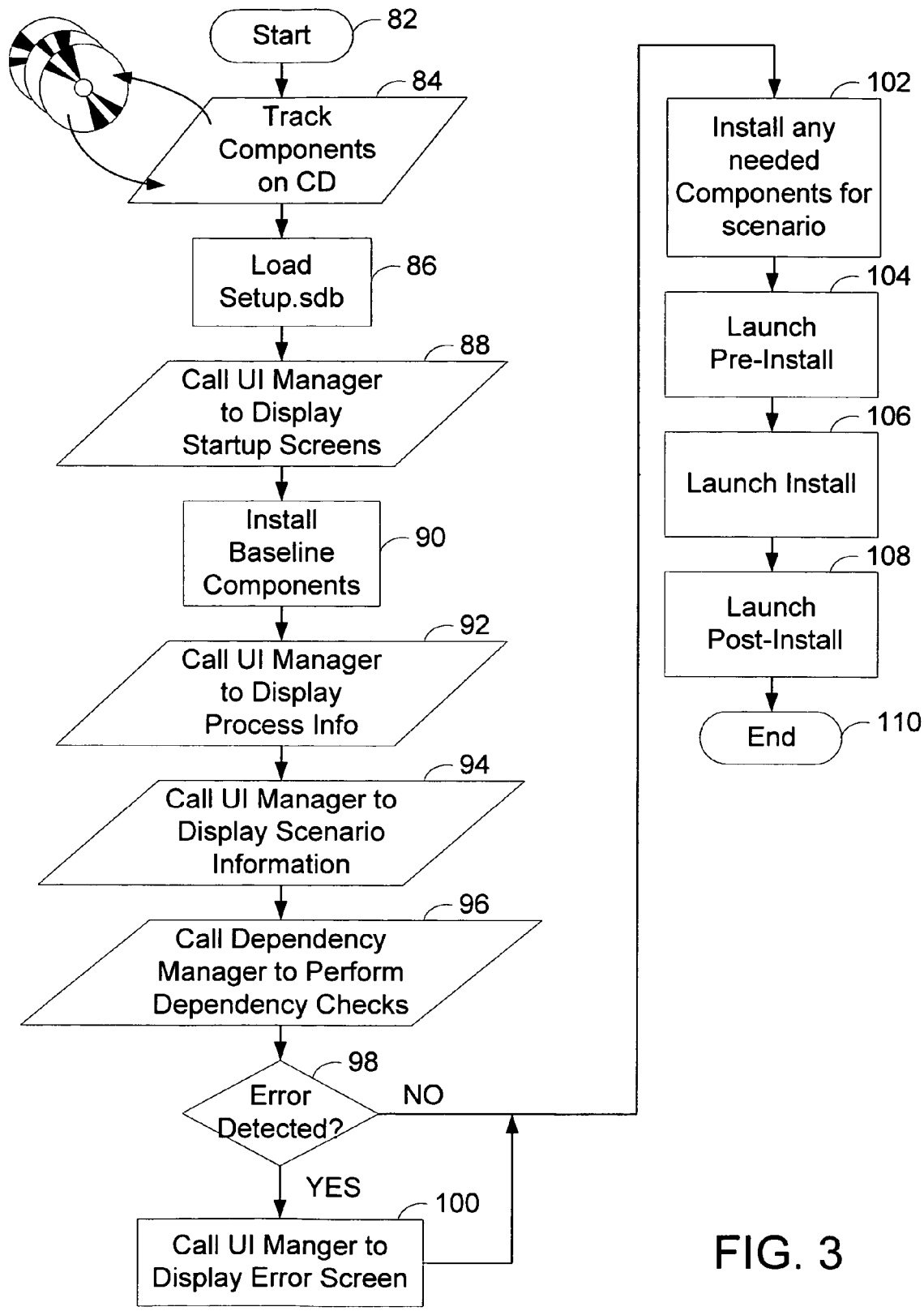
FIG. 3 is a simplified process flow diagram illustrating the setup management in accordance with a method of the instant invention.

With this basic understanding of installation process now in hand, attention is now directed to FIG. 3 for a more detailed explanation of the integration and installation process driven by the Setup Manager 79 of SIT. Once the Setup Manager has been initiated 82, it then tracks where the component bits are located on the suite CDs (the CD layout) 84. It then loads 86 the setup data file (setup.sdb) that contains general installation information, including scenarios, display order of components, list of startup and finish screens, etc. The UI Manager of SIT is then called 88 to display the suite installation startup screens from which the UI Manager gathers and validates user input. The Setup Manager then installs 90 required baseline components, and calls 92 the UI Manager to display progress information during baseline install (preferably, progress will be displayed during silent baseline as well). The UI Manager is then called 94 to retrieve and display scenario information from components and/or from the [Scenarios] section in data file as discussed above.

Then, the Dependency Manager is called 96 to perform dependency checking among the components that user has selected. This dependency checking will be described more fully below. If any conflicts are detected 98, the UI Manager is called 100 to display a Dependency UI screen. The dependency UI will display what the perceived conflicts are and will allow the user to cancel the request which caused the problem, or to have SIT automatically set the Actions of the required components to a state which resolves the issue. Scenario data files provide a simple hook into setup for third-party users of the Setup Manager. The Setup Manager also installs 102, when necessary, components needed to achieve the scenario baseline if it differs from the suite baseline. This may occur, e.g., when a third party modifies a scenario data file, but neglects to modify the setup data file. As a result, the scenario baseline is no longer a subset of the suite baseline and requires the installation of additional components. The Setup Manager also launches pre-install 104, install 106, and post-install 108 loops and sends messages to components/sub components to perform actions during these installation stages before the process terminates 110.

Third-party calls into this setup process are also supported in the system of the instant invention. If desired, these third parties can hook in as the setup data file is loaded. As an example, the data file shipped with a suite can be modified and shipped on a third party supplied CD that is loaded first in the installation process. In this case, the Setup Manager will load the updated data file containing third-party product information as part of the startup. Alternatively, third parties can hook in after the suite baseline has been achieved by replacing/rewriting the scenario data file.

Figure 4A:
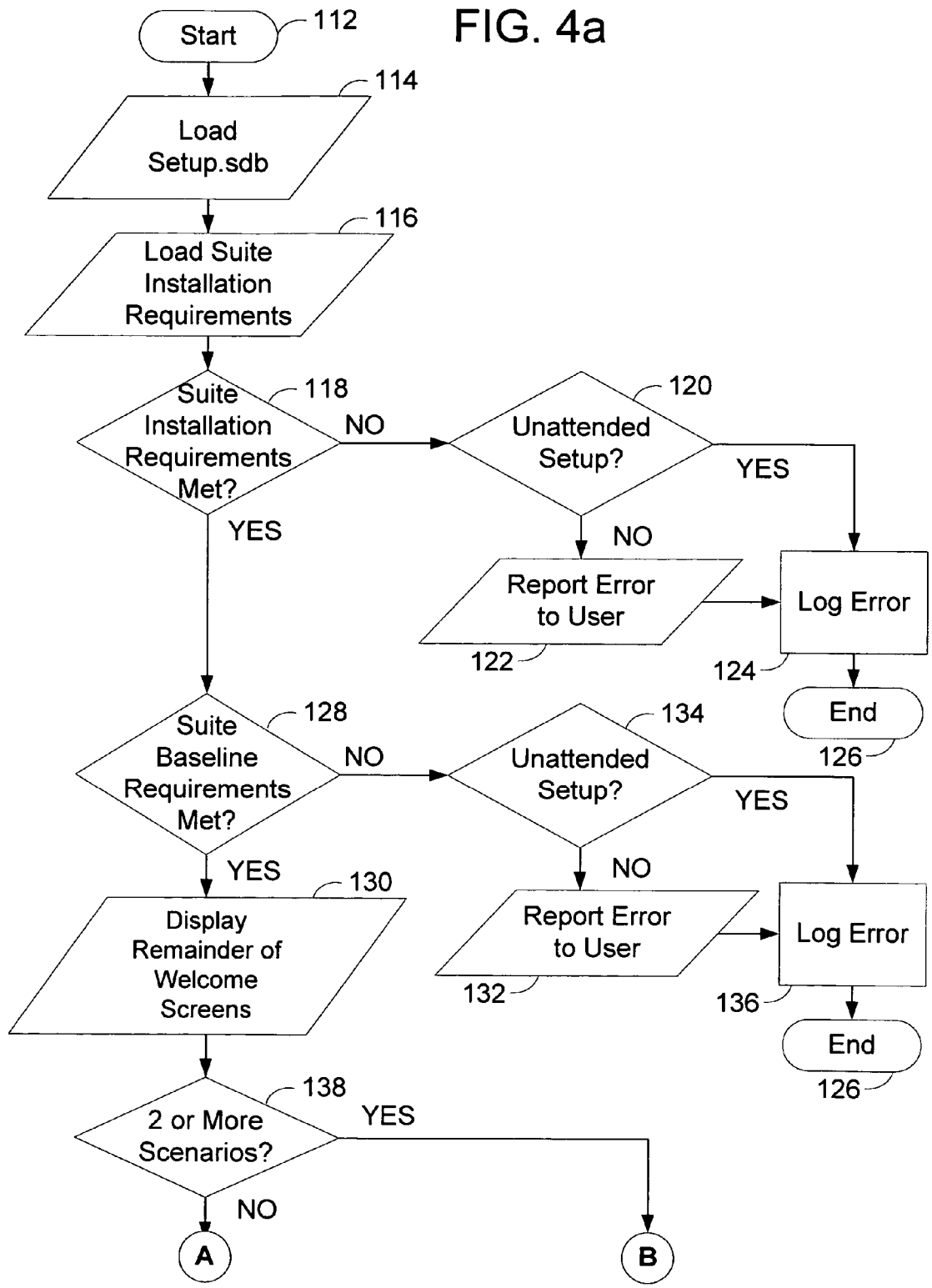
Figure 4B:
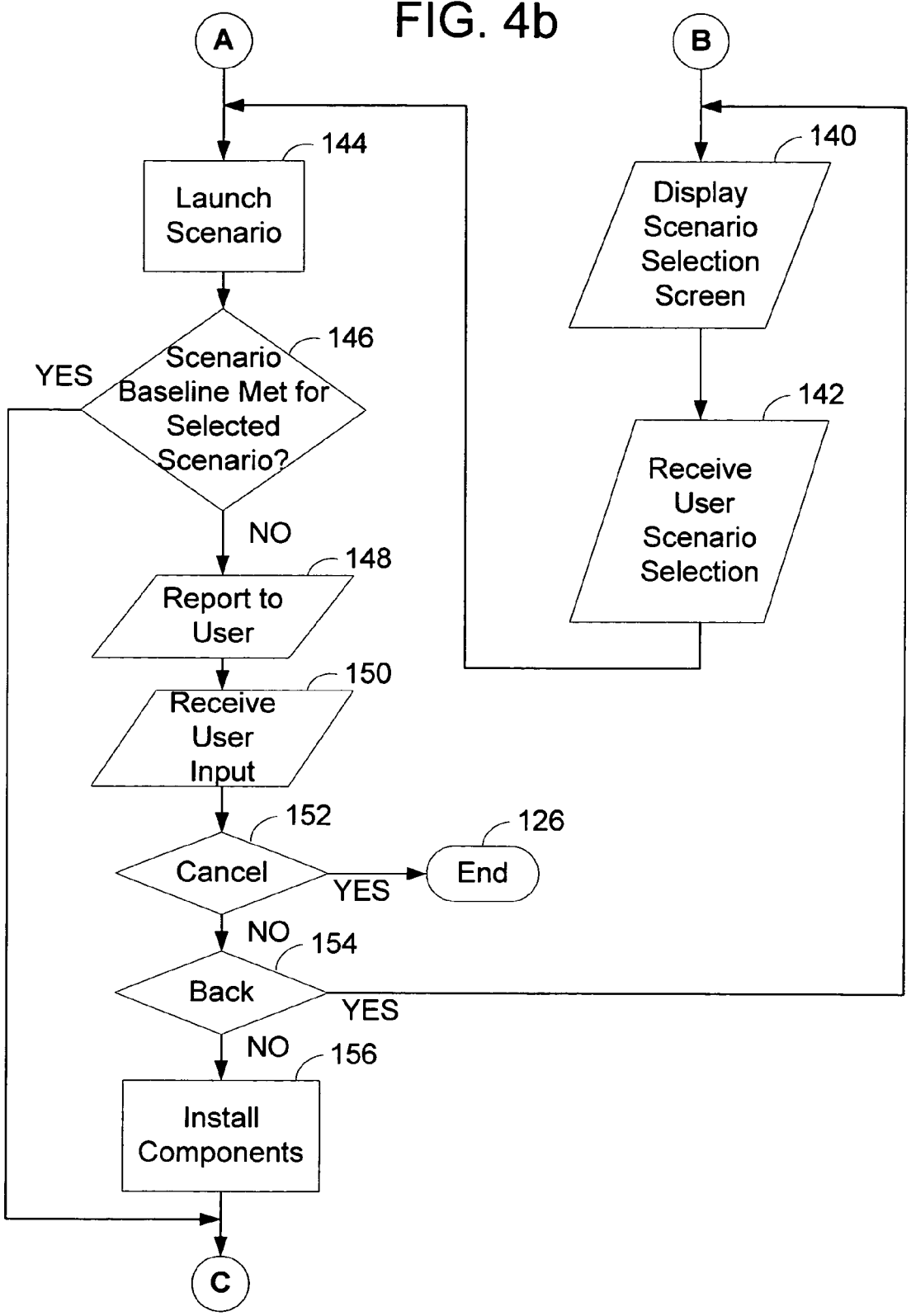

Turning now to FIGS. 4a-c, the basic flow of a suite setup is illustrated in greater detail. Once started 112, the setup.sdb file is loaded 114 as discussed above. If the setup data file is missing or cannot be loaded, a message box appears and informs the user of the problem. The suite installation requirements dynamic load libraries (dll) are then loaded 116 if specified, and a check is made 118 to determine if suite requirements have been met (i.e. RAM, processor, platform, pagefile, etc.). Insufficient suite requirements are reported to the user 122 via the Welcome screen, or an error is logged 124 and setup terminates 126 in the unattended case 120.

A check that the system meets the minimum requirements for the suite baseline is then performed 128. If the minimum requirements are not met, this is reported to the user 132. If the setup is unattended 134, the error is logged 136 and setup is terminated 126. Setting the custom property of all required suite baseline components can specify the suite baseline. This method is used when SIT is installing baseline components. The suite baseline can also be specified in the setup data file as indicated above. In such a case, SIT handles detection of the baseline, but the installation of baseline components is done outside of SIT.

Generally, suite baselines include OS, SPs, quick fix engineering or hot fixes (QFEs) (possibly as hidden components), Internet Explorer (IE), etc. The default Welcome page displays information about the user's machine and suite baseline components required, if any. Then the remainders of default startup screens are displayed 130. Preferably, all screens are optional, and may include Name/Organization, Password, product identification (PID), end user license agreement (EULA), AutoLogon, etc. Screens can be shown/hidden by adding/deleting the names of the screens in the [Startup Screens] section of the setup data file. A suite owner or third party can add their own UI at anytime in this sequence, or launch applications and/or processes during this sequence.

Next, if there are two or more scenarios 138, the scenario selection screen is displayed 140. This occurs once the suite baseline options have been satisfied and the startup screens (if specified), have been displayed. The screen displayed is the initial UI page specified in the scenario data file. On this page, users can choose 142 from a number of different pre-configured setups, or select Custom Scenario to completely customize the component or suite installation. Details of this process and the UI provided therefore will be described more fully below. If there is only one valid scenario available, that scenario is launched 144 without first displaying the Scenario Selection page. The scenario baseline based on the selected scenario is then checked 146. The user is informed 148 if the scenario baseline has not been met. By default, SIT provides the Scenario Baseline page that displays what components need to be on the user's machine and what components are currently installed, similar to the Welcome page used for communicating suite baseline requirements. The user can 150 click Next to install 156 the scenario baseline components and continue w/installation, click Cancel 152 to exit setup 126, or click Back 154 to select a different scenario.

The selected scenario may display a component selection page, such as that illustrated in FIG. 5 (specifically referred to and described below), if users are given the option of selecting/deselecting components and sub components. Briefly, the component selection page presents the user with a tree view containing all of the components and their sub components.

From this view the user may select or deselect a component and set its installation directory of any component. Users can also specify the setup action to be performed on each component or sub component (e.g. install, uninstall, add, recovery, no action). Version information and disk space requirements may also be displayed on this page. As users select and deselect the components or modify install actions on a component, full dependency checking is performed.

At this point in the setup, any components with additional UI requirements may present their UI pages 158. The default is to have custom UI pages for components appear in the order in which the components are listed in Component Selection page, although this may be changed as desired. Next, an installation summary is provided 160. All of the options and information the user has selected is displayed for final approval 162. Preferably, the user can navigate back to modify any of his or her selections from this screen.

Once the setup has been approved 162, the Setup Manager sends 164 pre-install message to all components and all sub components as discussed above. The components have the option of prompting the user if they want to perform the pre-install action for a component. The suite owner can also specify pre-install actions by default and suppress user prompt. The Setup Manager then sends 166 an install message to all selected components and sub components. Next, the Setup Manager sends 168 post-install message to all components and sub components. As with the pre-install, the components have the option of prompting user if they want to perform the post-install action for a component. The suite owner can also specify post-install actions by default and suppress user prompt.

During this process, an installation-progress page is provided 170. As SIT loops through pre-install components, install components, and post-install components as specified in the [Pre Install Order], [Install Order], and [Post Install Order] sections of the setup data file, the description text in the header of the progress screen updates with each change in install stage. This provides an indication of where in the process SIT is. SIT also adds a link 172 in the Add/Remove section of Control Panel. The name of the link corresponds to the suite name as specified in the [Product Information] section of the setup data file. Further, any installation errors encountered during the course of installation are logged 174 to a file specified in the [Error Log] section of the setup data file. A finish page is then displayed 176, and SIT writes out an unattend file for the completed setup.

Each component can launch 178 post-installation wizards or scripts. The suite can also specify a suite-wide wizard or script to be run, which can also be driven via the scenario. Each component may also specify an executable to run post-reboot 180. This can also be driven via the scenario. After these actions have been taken, as desired, the process is complete 182.

Figure 5:
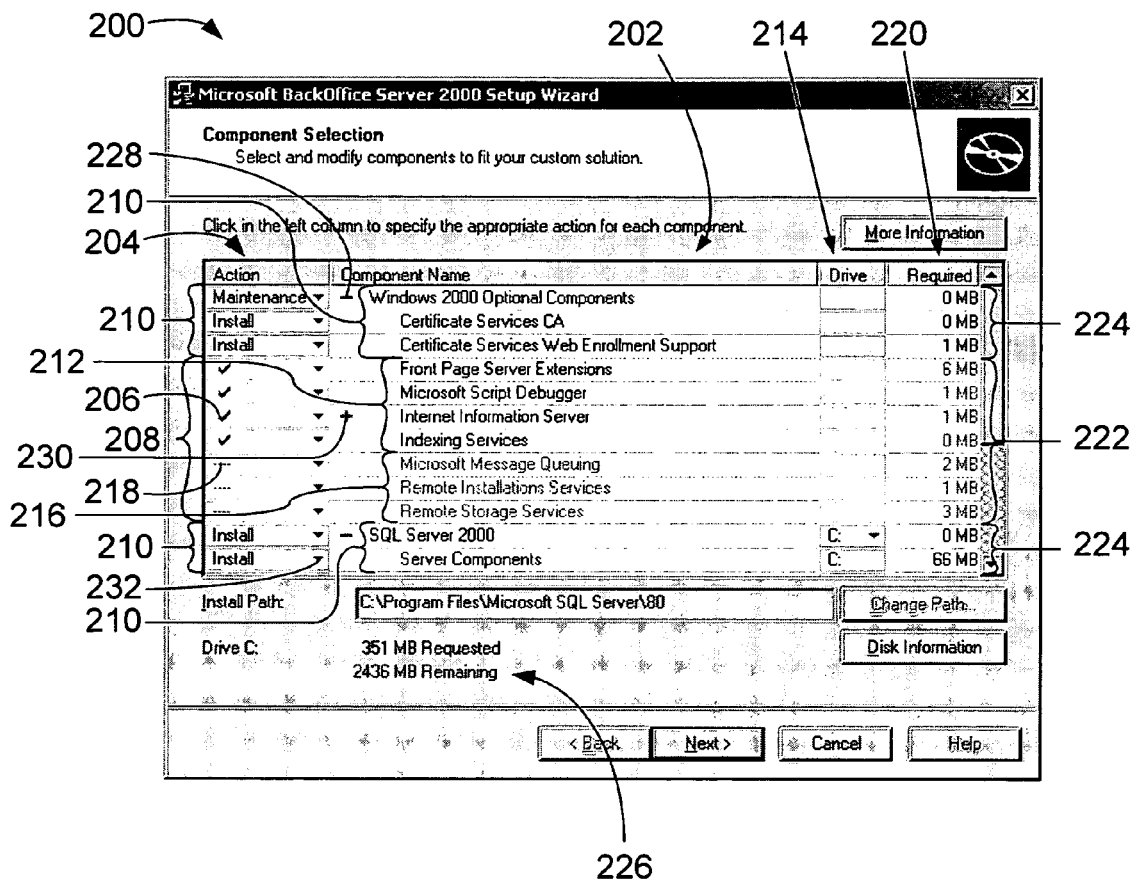
FIG. 5 is a screen shot illustration of a user interface (UI) constructed in accordance with the teachings of the instant invention.

As introduced above, once the user has selected the desired (or default) installation scenario, a component selection screen, such as screen 200 illustrated in FIG. 5, is displayed to the user. This screen 200 displays the components of the suite and the available install actions that may be performed thereon in portions 202 and 204 of a list box. This screen 200 is displayed if users are given the option of selecting/deselecting components and sub-components. The component selection screen 200 presents the user with a tree view containing all of the components and their sub-components. From this view, the user may select or deselect a component and set its installation directory. Users can also specify the setup action to be performed on each component/sub-component (e.g. install, uninstall, add, recovery, no action, etc.). Version information and disk space requirements may also be displayed on this page. As users select and deselect the components or modify install actions on a component, full dependency checking is performed.

Unlike prior systems of check boxes, the action section 204 of screen 200 displays additional information besides simply the check or no-check of these prior system. In the UI of the instant invention, a check mark 206 is used to signify that the component is installed and that no action need or will be taken. Additionally, in a preferred embodiment the UI also displays a coloring difference between components that are in the process of installing or are already installed 208 versus the components that are set to install but are not installed 210 to further distinguish these different states. For a component that is installed and the action is not changing 212, the text for the component name is darker than the other text. Similarly, the text is also darker for components that are going to be installed 210, except in these cases the background behind the action section 204 and the install drive section 214 is also darker. The components that are not currently installed and will not be installed 216 are denoted with text that is relatively lighter than those components 210, 212 described above. A dash 218 is illustrated in the action section 204 for these components 216 to illustrate that they are not installed and will not be installed.

The UI 200 of the instant invention also provides information regarding the disk space required for the installation of each component in section 220. As may be seen from an examination of this section, the text 222 for the components that are already installed 212 and for the components are not going to be installed 216 is relatively lighter than the text 224 for those components 210 that are going to be installed. In this way, the user may be able to determine if there is adequate space remaining for the requested installation. To aid in this determination, the UI 200 also provides a summation of the disk space requirements for the components requested to be installed 224 and the remaining disk space 226. Many prior systems could not differentiate between the installed applications and the applications to be installed, and therefore, displayed the total disk requirement of both these categories. This resulted in the display of misleading information that made it seem that the installation disk space requirements were larger than actually needed.

The UI utilizes a directory tree structure to display components and their sub-components. As will be recognized, sub-components are indented under and indented from the components from which they depend. The listing may also be expanded or contracted at any level that has sub-components thereunder. For example, in the component area 202, the "Windows 2000 Optional Components" component is expanded to show its direct sub-components as indicated by the "−" symbol 228, whereas the "Internet Information Services" sub-component is not expanded as indicated by the "+" symbol 230.

Figure 6:
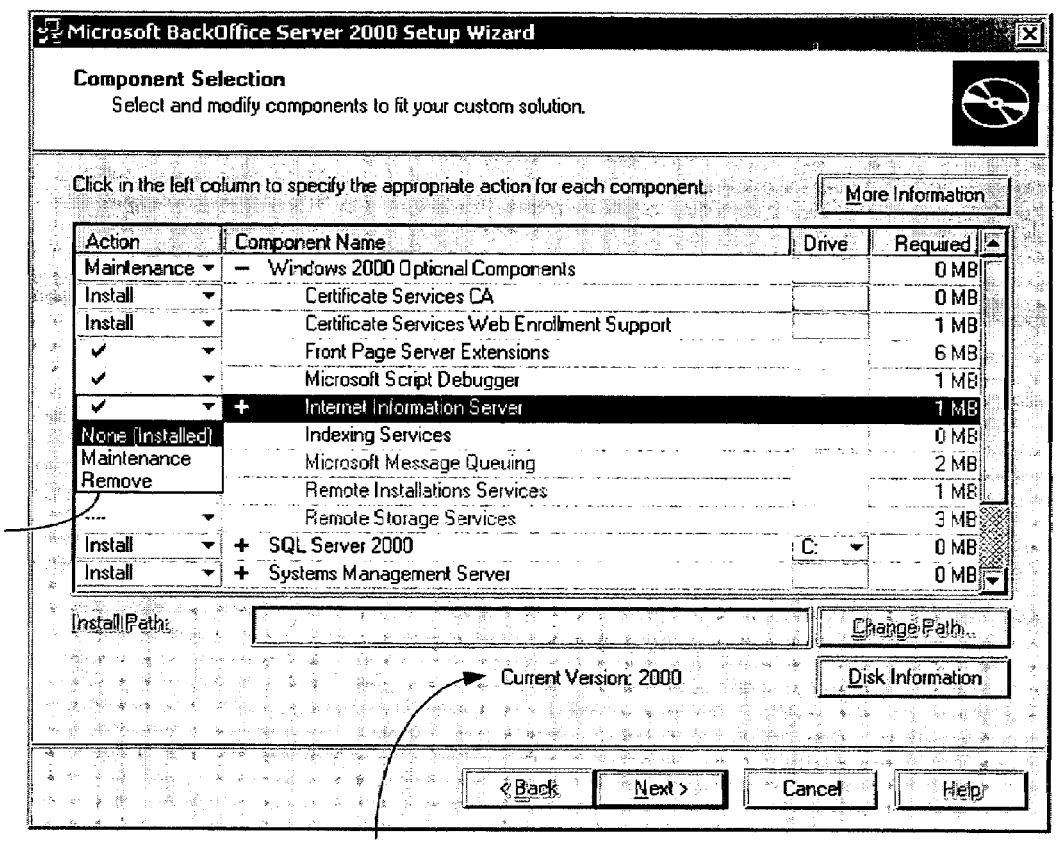
FIG. 6 is a further screen shot illustration of the UI of FIG. 5 illustrating a further aspect of the instant invention.

The UI 200 of the instant invention also displays a pull down arrow 232 in the actions section 204 for user selection of the available install actions. As illustrated in FIG. 6, once the pull down arrow 232 is selected, a pull down menu 234 is displayed. This pull down menu 234 contains all of the available install actions (results) for that component. As discussed above, these install actions and their names (based on the state of the component once the actions is performed) are defined by the components themselves to allow for maximum flexibility. The number of available actions is not limited by the system of the instant invention, nor is the selection of the action name. The ordering, grouping, and display of the actions' name is, preferably, under the SIT control. In one embodiment, the install actions are grouped by category, and then alphabetically, although other categorizations, groupings, and sortings of actions are possible. Also, once selected the entire row of the selected component is preferably highlighted for added clarity. The current version 236 of the component is also illustrated to allow the users to make informed decisions about updating or reinstalling components.

The actions included in the exemplary pull down menu 234 are None (Installed), which results in the check mark being displayed once selected, Maintenance, and Remove. If the component were not installed, the option of Install would replace the action Remove. In this way, only those actions that are available based on the component state are shown to the user. For components that have sub-components or children, the selection of Install or Remove will signify a default action of Install or Remove for all of the sub-components or children. This default may be individually changed by expanding the component and individually selecting the appropriate or desired action for each sub-component or child. When such individual control is exercised, the displayed install action for the parent is preferably changed to Maintenance, although other conventions may be adopted in accordance with the above teachings as desired. If the states of the children are different from the default and the tree for the parent is collapsed (so that the individual sub-components are no longer displayed), the action field will preferably show the action with a "+" symbol, or other symbol to designate that at least one of sub-components have additional or different actions that will be performed.

Figure 7:
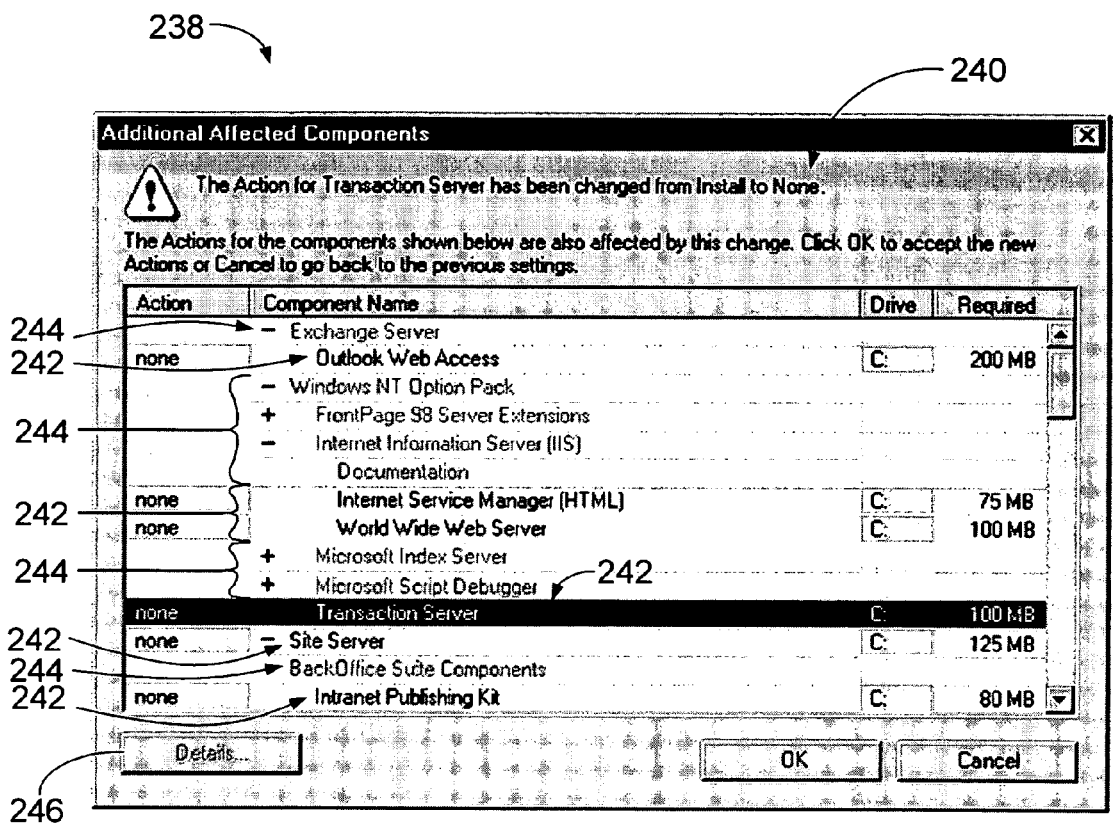
FIG. 7 is a screen shot illustration of a user interface (UI) constructed in response to an attempted dependency violation.

If individual control is exercised on a child or sub-component such that a dependency or other requirement is violated, a screen 238 such as that illustrated in FIG. 7 is displayed. This screen 238 displays the problem with the current selection, and proposes a solution to allow the installation to proceed without error in text line 240. Both the component name and the action listed in this text message 240 are dynamic and reflect the specific scenario that resulted in this screen 238 generation. For example, the screen will propose the installation of any required component to satisfy the dependency. For problems that cannot be automatically fixed by the SIT, such missing hardware components, a simple text box describing the problem is displayed.

This screen 238 displays all components 242 whose actions are affected by the proposed change in dark text, and all other, non-affected components 244 in greyed text to show context of the affected components 242 only. Initially, the component that initiated the Dependency dialog (the Transaction Server in this example) is selected as on the Component Selection Screen 200. In this initial state, the Details button 246 is disabled because no additional information is needed to describe the dependency violation.

Figure 8:
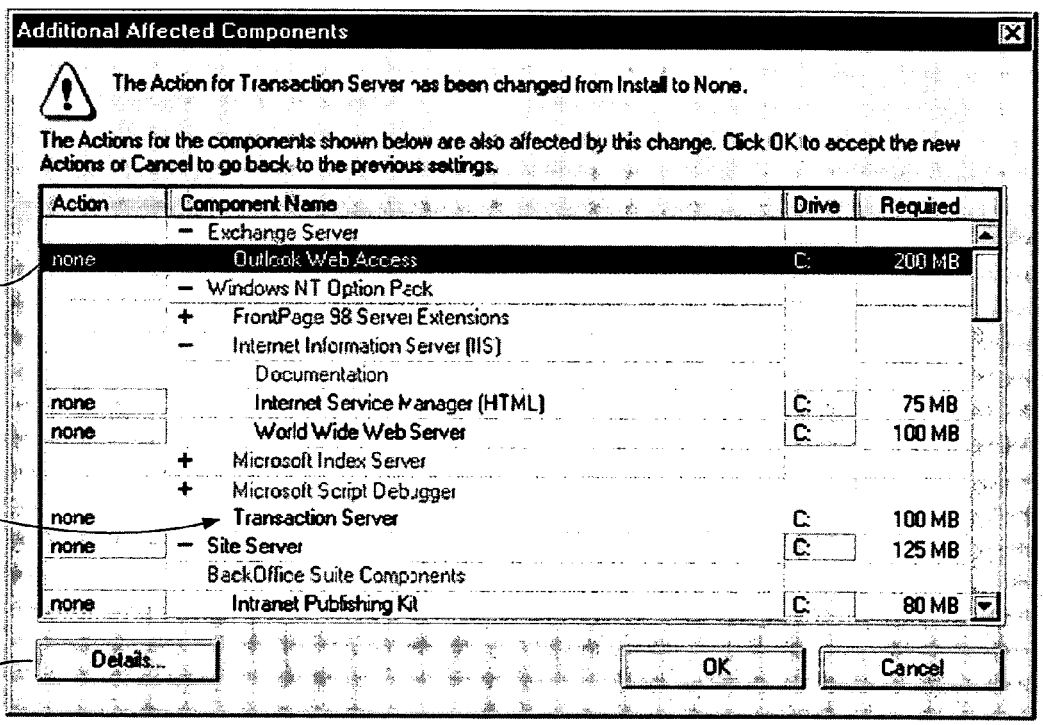
FIG. 8 is a screen shot illustration of the UI of FIG. 7 wherein a user has selected one of the affected components.

As illustrated in FIG. 8, if a user selects any other component affected by the dependency violation, such as highlighted component 248 (Outlook Web Access in this example), the Details button 246 is then enabled. In a preferred embodiment, the component 250 that initiated the Dependency dialog screen 238 remains highlighted with a background color that maps to the Tooltip color to provide a visual context of the initiating component.

Figure 9:
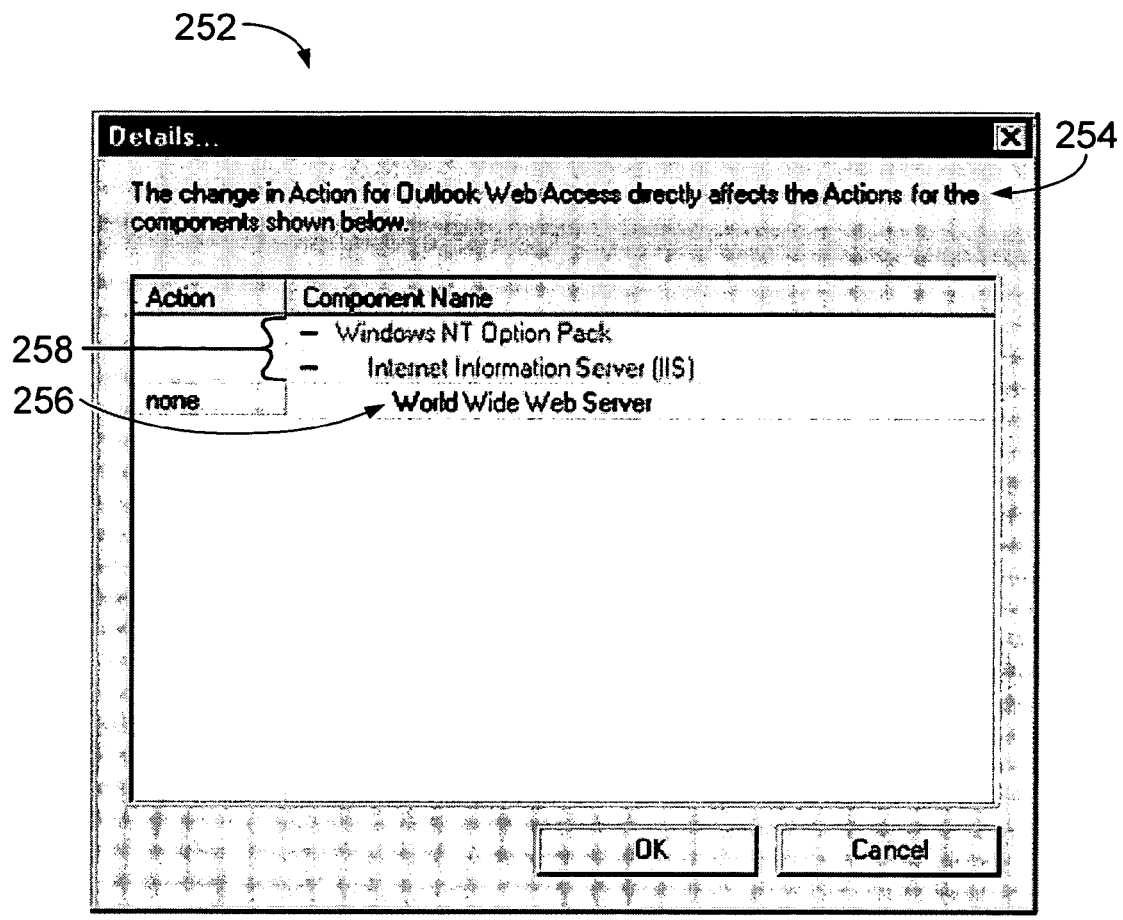
FIG. 9 is a screen shot illustration of a user interface (UI) displayed in response to user selection of a Details button on the UI of FIG. 8.
Figure 10:
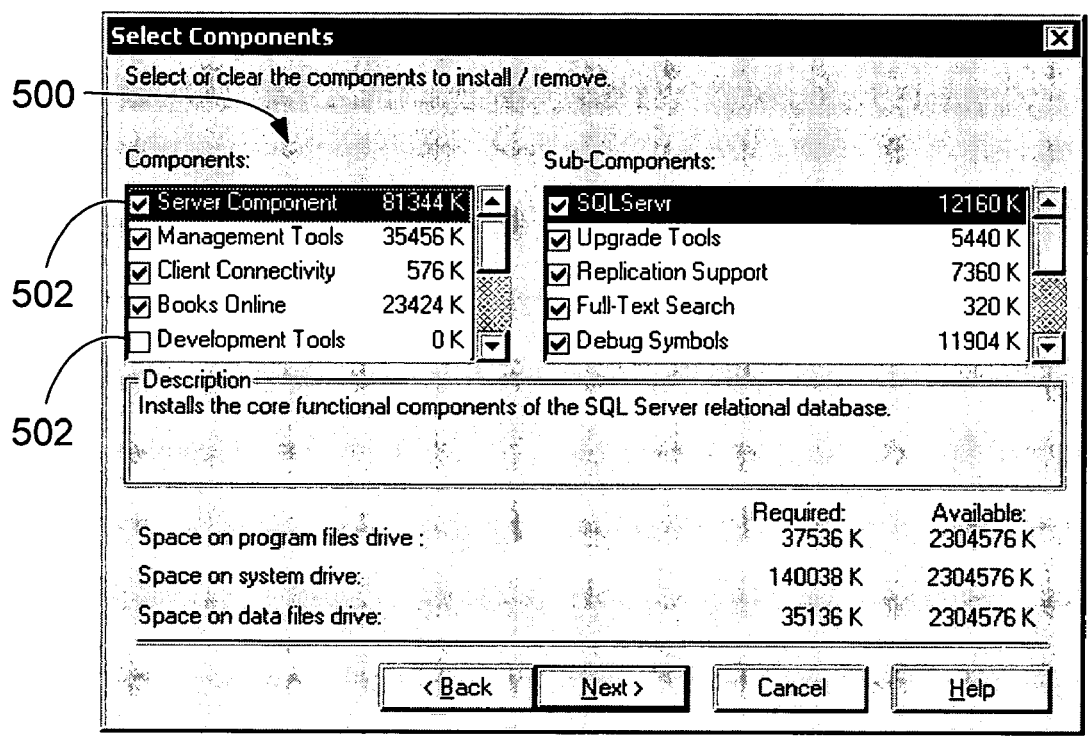
FIG. 10 is a screen shot illustration of a prior installation application's check-box user interface (UI)
Figure 11:
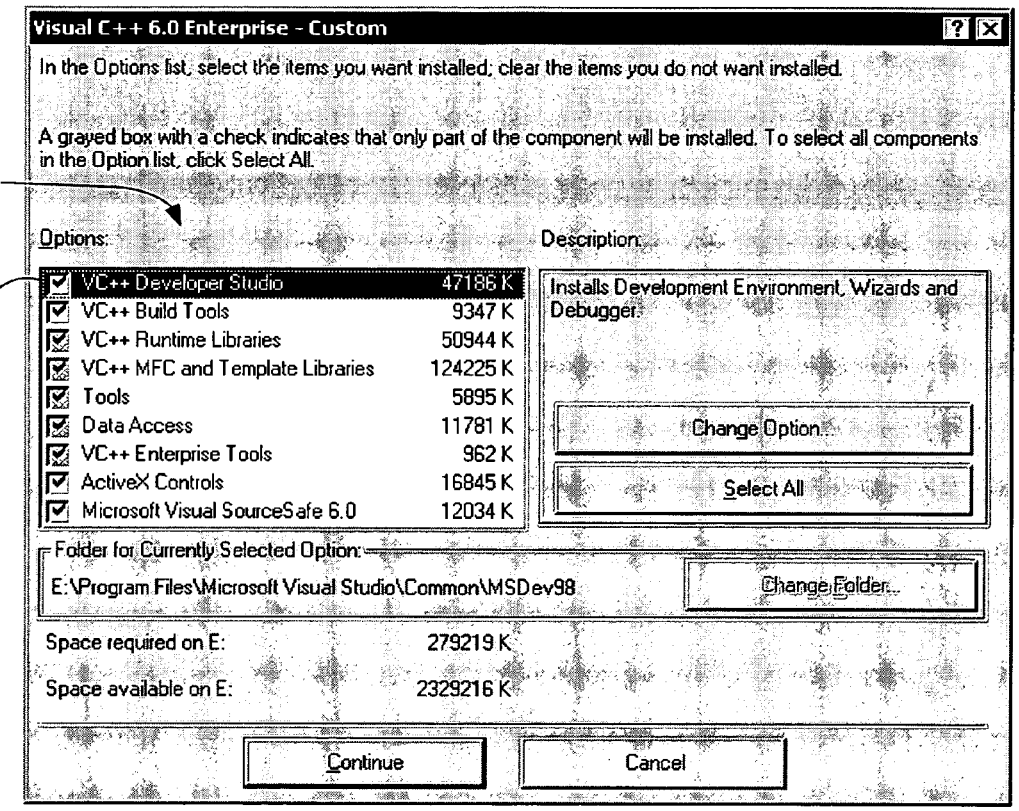
FIG. 11 is a screen shot illustration of an alternate prior installation application's check-box user interface (UI)
Figure 12:
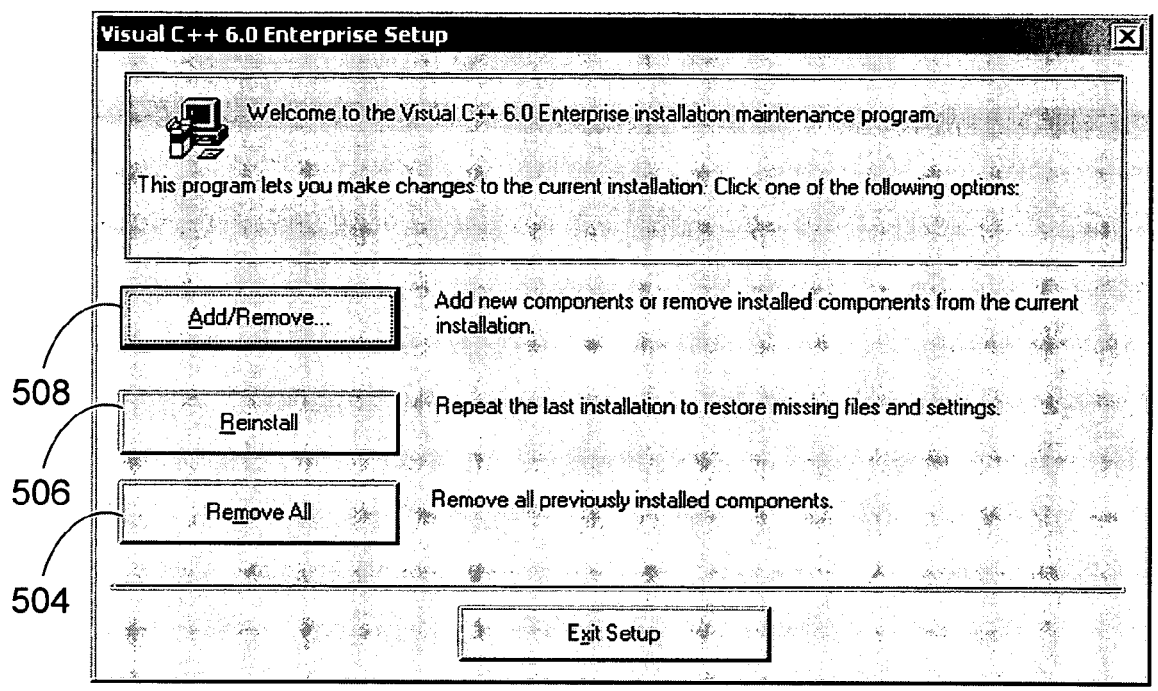
FIG. 12 is a screen shot illustration of a prior installation application's user interface to support additional installation actions.

Selection of the Details button 246 will display a filtered view of the Dependency dialog screen 238, such as is illustrated in FIG. 9 by screen 252. In this filtered view 252, the name of the component selected in the prior screen 238 is displayed in a text message 254. As indicated in this text message 254, the change in Action for this component 248 directly affects the Actions for the below listed component(s) 256. Other components not affected 258 are grayed, and included to provide context for the affected component(s) 256.

To build the component selection screen 200, the SIT of the instant invention queries each component for a list of the install actions that it can support as discussed above. The SIT then shows this list to the end-users in the listbox 234, and they are able to select whichever install action works best for them. Each install action must have a "result" associated with it to tell SIT what will happen with the component after the install action has bee completed. Each SIT component implements an ISetupComponent interface. This interface exposes a method to allow another component or manager of SIT to query for a specific interface. When the ISetupInstallActionCollection is queried, a list of the available actions is returned in the form of one ISetupInstallAction interface for each available action.

This interface exposes several methods. The method ISetupInstallAction:: GetInteger() allows the component writer to associate each action with a unique identifier. This allows the SIT to set an action on a component without needing to rely on the text of that action. This makes the localization of the SIT easier. The unique identifier also prevents confusion with the SIT if a component has multiple install actions that may have the same result. For the example discussed above wherein a forklift action is described, its result is install, as is the result of the install action. If a unique identifier were not utilized to differentiate the method from which the result was obtained, the SIT would not be able to properly persist after a reboot. Therefore, every write and install action has the ability to associate a unique integer with that action that is specific to that component only. The method ISetupInstallAction:: GetString() retrieves the string that is displayed to the user when they are selecting which action to chose for a component. This string is not used in any of the computations in SIT, so it is not required to meet any standard. This also increases the flexibility.

Since a component can have any number of install actions, there is a possibility that one of more of the install actions that would normally be available may not be available in a specific case. If this is true, the ISetupInstallAction::GetProblem() action is needed install action returns information that it has a "problem" being set. This problem is linked to another string that described the problem to a user. An example may be that Microsoft Proxy Server requires an NTFS drive to install on, and one may not be present on the current machine. Instead of not allowing the user to install proxy without any reason why, the "Install" action will be available for the user to select, and if selected will show an error message related to why it cannot be set to the selected action, in this case the lack of an NTFS drive.

Although there can be any number of install actions, there is a finite set of "results" that these actions can present. The ISetupInstallAction::GetResult() actions allows SIT to act accordingly on the install action selected by using it's result instead of needing to know specific information about the type of action. There are preferably four possible install results that an action can have: Installed, Removed, Nothing, or Maintenance. As their names imply, Install signifies that the component is now installed on the machine, Remove signifies that the application is no longer installed on the machine, and Nothing signifies that no action was taken on the component. The Maintenance action is provided to allow a component to do nothing but still allow changes to be done to it's sub-components (children).

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer-readable medium having stored thereon a suite of computer-executable components comprising;
    at least one component implementing a component setup interface, said component setup interface exposing a first method to allow another component to query for a specific setup install action interface for each install action available for the component, wherein said setup install action interface comprises a GetResult method that returns a resultant state of the component after performance of the install action.

2. The computer-readable medium of claim 1, wherein said setup install action interface comprises a GetInteger method allowing an association of a unique integer with each install action.

3. The computer-readable medium of claim 1, wherein said setup install action interface comprises a Getstring method for returning a string that is displayed for each install action.

4. The computer-readable medium of claim 1, wherein said setup install action interface comprises a Getproblem method for returning information that the component has a problem, and wherein said information is linked to a string that is displayed to a user.

5. The computer-readable medium of claim 1, wherein a first resultant state is Install, and wherein said Install resultant state indicates that the component is installed.

6. The computer-readable medium of claim 1, wherein a first resultant state is Remove, and wherein said Remove resultant state indicates that the component is no longer installed.

7. The computer-readable medium of claim 1, wherein a first resultant state is Nothing, and wherein said Nothing resultant state indicates that no action was taken on, the component.

8. The computer-readable medium of claim 1, wherein a first resultant state is Maintenance, and wherein said Maintenance resultant state indicates that no action was taken on the component but that actions are taken on a sub-component of the component.

* * * * *